(12) United States Patent
Nesse et al.

(10) Patent No.: US 9,154,379 B2
(45) Date of Patent: *Oct. 6, 2015

(54) REMOTE CONFIGURATION OF A HARDWARE DEVICE MODULE OF A SECURITY SYSTEM

(75) Inventors: Ted Nesse, Stillwater, MN (US); Jim Stevens, Mahtomedi, MN (US)

(73) Assignee: SERCOMM CORPORATION, Taipei (TW)

( * ) Notice: Subject to any disclaimer, the term of this patent is extended or adjusted under 35 U.S.C. 154(b) by 1344 days.

This patent is subject to a terminal disclaimer.

(21) Appl. No.: 11/923,954

(22) Filed: Oct. 25, 2007

(65) Prior Publication Data

US 2009/0113344 A1    Apr. 30, 2009

(51) Int. Cl.
*G06F 15/16* (2006.01)
*H04L 12/24* (2006.01)

(52) U.S. Cl.
CPC ........ *H04L 41/0866* (2013.01); *H04L 41/0803* (2013.01); *H04L 41/0856* (2013.01); *H04L 41/22* (2013.01)

(58) Field of Classification Search
CPC ............ H04L 41/0803; H04L 41/0856; H04L 41/0866; H04L 41/22
See application file for complete search history.

(56) References Cited

U.S. PATENT DOCUMENTS

| | | | | |
|---|---|---|---|---|
| 4,466,063 A * | 8/1984 | Segarra et al. | ................ | 709/226 |
| 5,256,863 A * | 10/1993 | Ferguson et al. | ............... | 705/21 |
| 5,257,007 A | 10/1993 | Steil et al. | | |
| 5,715,453 A * | 2/1998 | Stewart | ......................... | 715/207 |
| 5,781,902 A * | 7/1998 | Waszkiewicz | ........................ | 1/1 |
| 5,838,907 A * | 11/1998 | Hansen | ......................... | 709/220 |
| 5,897,635 A * | 4/1999 | Torres et al. | .......................... | 1/1 |
| 5,980,078 A | 11/1999 | Krivoshein et al. | | |
| 6,098,098 A * | 8/2000 | Sandahl et al. | ............... | 709/221 |
| 6,141,681 A * | 10/2000 | Kyle | .............................. | 709/206 |
| 6,286,038 B1 * | 9/2001 | Reichmeyer et al. | ......... | 709/220 |
| 6,360,262 B1 * | 3/2002 | Guenthner et al. | ........... | 709/226 |
| 6,378,069 B1 | 4/2002 | Sandler et al. | | |
| 6,400,958 B1 * | 6/2002 | Isomursu et al. | ............. | 455/466 |
| 6,529,589 B1 * | 3/2003 | Nelson et al. | ............ | 379/102.01 |
| 6,560,659 B1 * | 5/2003 | Tobias et al. | ...................... | 710/8 |
| 6,725,032 B1 * | 4/2004 | Sheridan et al. | .............. | 455/419 |
| 6,772,204 B1 | 8/2004 | Hansen | | |
| 6,788,980 B1 * | 9/2004 | Johnson | ........................... | 700/1 |
| 6,826,581 B2 | 11/2004 | Moslander et al. | | |
| 7,047,088 B2 * | 5/2006 | Nakamura et al. | .............. | 700/19 |
| 7,206,651 B2 | 4/2007 | Takemura et al. | | |
| 7,234,115 B1 * | 6/2007 | Sprauve et al. | ............... | 715/746 |
| 7,237,102 B2 | 6/2007 | Rothman | | |

(Continued)

OTHER PUBLICATIONS

Co-pending U.S. Appl. No. 11/923,385, filed Oct. 24, 2007.

(Continued)

*Primary Examiner* — Esther B Henderson
*Assistant Examiner* — Anthony Fabbri
(74) *Attorney, Agent, or Firm* — Ding Yu Tan

(57) ABSTRACT

A security system is provided. The security system comprises a plurality of hardware device modules and a plurality of sensor detection devices. At least one hardware device module has a microcontroller coupled to a memory element that stores a configuration map for remote configuration comprising configuration option information available for the hardware device module. The plurality of sensor detection devices are capable of sending a signal to one or more of the hardware device modules.

16 Claims, 3 Drawing Sheets

| 410-M | 410-I | 410-T | 410-S | 410-C | 410-G | 410-N | 410-X | 410-V | 410-D | 410-A | 410-P |
|---|---|---|---|---|---|---|---|---|---|---|---|
| M # | I # | T# | S# | C# | G# | N# | X# | V# | D# | A# | P# |
| M # | I # | T# | S# | C# | G# | N# | X# | V# | D# | A# | P# |
| M # | I # | T# | S# | C# | G# | N# | X# | V# | D# | A# | P# |
| M # | I # | T# | S# | C# | G# | N# | X# | V# | D# | A# | P# |

405 (each row)

230

(56) References Cited

U.S. PATENT DOCUMENTS

| | | | |
|---|---|---|---|
| 7,330,109 B2* | 2/2008 | Martin | 340/506 |
| 9,100,284 B2* | 8/2015 | Kovacsiss, III | 1/1 |
| 2001/0011284 A1* | 8/2001 | Humpleman et al. | 707/511 |
| 2001/0037389 A1* | 11/2001 | Fujimori et al. | 709/225 |
| 2002/0023188 A1 | 2/2002 | Heidel et al. | |
| 2002/0035404 A1* | 3/2002 | Ficco et al. | 700/65 |
| 2002/0052719 A1* | 5/2002 | Alexander et al. | 702/188 |
| 2002/0095490 A1* | 7/2002 | Barker et al. | 709/224 |
| 2002/0143934 A1* | 10/2002 | Barker et al. | 709/224 |
| 2003/0163289 A1* | 8/2003 | Whelan et al. | 702/188 |
| 2004/0015619 A1* | 1/2004 | Brown et al. | 710/19 |
| 2004/0021678 A1* | 2/2004 | Ullah et al. | 345/700 |
| 2004/0095237 A1* | 5/2004 | Chen et al. | 340/506 |
| 2004/0123149 A1* | 6/2004 | Tyroler | 713/201 |
| 2005/0004559 A1* | 1/2005 | Quick et al. | 606/1 |
| 2005/0022183 A1 | 1/2005 | Poisson et al. | |
| 2005/0033477 A1 | 2/2005 | Friedman | |
| 2005/0055716 A1* | 3/2005 | Louie et al. | 725/58 |
| 2005/0060562 A1* | 3/2005 | Bhattacharya et al. | 713/200 |
| 2005/0149639 A1* | 7/2005 | Vrielink et al. | 710/8 |
| 2005/0172258 A1* | 8/2005 | Nixon et al. | 717/100 |
| 2005/0192847 A1 | 9/2005 | Satheesan et al. | |
| 2005/0216580 A1* | 9/2005 | Raji et al. | 709/223 |
| 2005/0289224 A1* | 12/2005 | Deslippe et al. | 709/208 |
| 2006/0092011 A1* | 5/2006 | Simon et al. | 340/521 |
| 2006/0125632 A1* | 6/2006 | Luebke et al. | 340/539.26 |
| 2006/0155812 A1* | 7/2006 | Looman | 709/206 |
| 2006/0168322 A1* | 7/2006 | Gray et al. | 709/238 |
| 2006/0184350 A1* | 8/2006 | Huang et al. | 703/26 |
| 2006/0232295 A1 | 10/2006 | Agrawal et al. | |
| 2007/0113186 A1* | 5/2007 | Coles et al. | 715/735 |
| 2007/0124468 A1* | 5/2007 | Kovacsiss, III | 709/225 |
| 2007/0195711 A1 | 8/2007 | Morris et al. | |
| 2007/0236346 A1* | 10/2007 | Helal et al. | 340/539.22 |
| 2008/0061923 A1 | 3/2008 | Simon et al. | |
| 2008/0072314 A1* | 3/2008 | Frenette | 726/19 |
| 2008/0316024 A1* | 12/2008 | Chantelou et al. | 340/539.17 |
| 2009/0066789 A1* | 3/2009 | Baum et al. | 348/143 |
| 2009/0113193 A1* | 4/2009 | Nesse et al. | 713/1 |
| 2010/0245107 A1* | 9/2010 | Fulker et al. | 340/691.6 |
| 2014/0143695 A1* | 5/2014 | Sundermeyer et al. | 715/765 |
| 2015/0088982 A1* | 3/2015 | Johnson et al. | 709/203 |

OTHER PUBLICATIONS

International Search Report of PCT/US2008/079077, dated Apr. 24, 2009.

Written Opinion of the International Searching Authority of PCT/US2008/079077, dated Apr. 24, 2009.

International Search Report of PCT/US2008/079084, dated Apr. 28, 2009, 3 pages.

Written Opinion of the International Searching Authority of PCT/US2008/079084, dated Apr. 28, 2009, 4 pages.

Office Action issued for U.S. Appl. No. 11/923,385, dated Sep. 5, 2012 (11 pages).

Office Action issued for U.S. Appl. No. 11/923,385, dated Jan. 27, 2012 (21 pages).

* cited by examiner

| 410-M | 410-I | 410-T | 410-S | 410-C | 410-G | 410-N | 410-X | 410-V | 410-D | 410-A | 410-P |
|---|---|---|---|---|---|---|---|---|---|---|---|
| M # | I # | T# | S# | C# | G# | N# | X# | V# | D# | A# | P# |
| M # | I # | T# | S# | C# | G# | N# | X# | V# | D# | A# | P# |
| M # | I # | T# | S# | C# | G# | N# | X# | V# | D# | A# | P# |
| M # | I # | T# | S# | C# | G# | N# | X# | V# | D# | A# | P# |

230

REMOTE CONFIGURATION OF A HARDWARE DEVICE MODULE OF A SECURITY SYSTEM

INCORPORATION BY REFERENCE

U.S. Non-Provisional patent application Ser. No. 11/923,385, entitled "ON-SITE CONFIGURATION OF A HARDWARE DEVICE MODULE OF A SECURITY SYSTEM," filed on Oct. 24, 2007, is hereby incorporated by reference in its entirety.

FIELD

This disclosure relates generally to the field of security systems. More particularly, the disclosure relates to systems and methods for remote configuration of a hardware device module of a security system.

BACKGROUND

Remote configuration of a security system is known. Typically, configuration of the multiple devices in a security system is achieved by a remote programming tool that is preprogrammed with a configuration utility that has a preset option list for each device to configure that device with the security system. The remote programming tool is typically indirectly coupled to the security system via a modem connection or via an Ethernet/Internet connection. In these security systems, the programming options are limited to the preset option list hard coded onto the remote programming tool. In order for the security system to support new or modified devices, the remote programming tool must install configuration updates on a regular basis. Accordingly, it becomes difficult for the remote programming tool to configure the security system when new devices are added or existing devices are modified with enhanced functionality.

For the reasons stated above, and for other reasons stated below that will become apparent to those skilled in the art upon reading and understanding the present specification, there is a need in the art for improved systems and methods for remote configuration of a configurable hardware device module of a security system.

SUMMARY

This disclosure relates to improved systems and methods for remote configuration of a configurable hardware device module of a security system. These systems and methods would allow a remote programming tool to stay compatible with other new device modules that may be added to the system, or to existing device modules that are modified with enhanced functionality. In particular, the configurable hardware device module has a configuration map comprising configuration option information available for the configurable hardware device module that can be transferred to a remote programming tool for generating a user friendly dynamic user interface to configure the configurable hardware device module.

In one embodiment, a security system is provided. The security system comprises a plurality of hardware device modules and a plurality of sensor detection devices. At least one hardware device module has a microcontroller coupled to a memory element that stores a configuration map for remote configuration comprising configuration option information available for the hardware device module. The plurality of sensor detection devices are capable of sending at least a signal to one or more of the hardware device modules.

In another embodiment, a configurable hardware device module usable in a security system is provided. The configurable hardware device module comprises a microcontroller and a memory element coupled to the microcontroller. The memory element stores a configuration map for remote configuration comprising configuration option information available for the configurable hardware device module.

In another embodiment, a remote programming tool capable of indirectly coupling to a security system is provided. The remote programming tool comprises a processor and a memory storage coupled to the processor. The memory storage stores a configuration engine that is capable of generating a dynamic user interface based on a configuration map received from a configurable hardware device module.

In yet another embodiment, a method of remote configuration of a configurable hardware device module of a security system is provided. The method includes providing a configurable hardware device module having a configuration map and indirectly coupling a remote programming tool having a configuration engine, a display and a user input device to the security system. The method also includes transferring the configuration map from the configurable hardware device module to the remote programming tool and generating a dynamic user interface specifically tailored to the configurable hardware device module using the configuration engine in the remote programming tool and the configuration map transferred into the remote programming tool from the configurable hardware device module.

DETAILED DESCRIPTION

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice what is claimed, and it is to be understood that other embodiments may be utilized and that logical, mechanical and electrical changes may be made without departing from the spirit and scope of the claims. The following detailed description is, therefore, not to be taken in a limiting sense.

Embodiments presented herein involve systems and methods for remote configuration of a configurable hardware device module of a security system. As described herein, remote configuration means that a remote programming tool is indirectly coupled to the configurable hardware device module being programmed via a data network, for example, an Ethernet or WiFi connection, a modem connection, a wireless connection or a cellular system like GSM/GPRS. The remote programming tool provides remote configuration to the security system whether the remote programming tool is located on the premises being secured or is located remote from the premises being secured. Advantageously, these embodiments provide a remote programming tool that is compatible with existing configurable hardware device modules, with new configurable hardware device modules that may be added to the security system and with existing configurable hardware device modules that are modified with enhanced functionality. In the embodiments described below, the remote programming tool is described as a personal computer. However, in other embodiments, the remote programming tool can be a laptop, cell phone, PDA device or an electronic tool specifically designed for remote programming.

Figure 1:
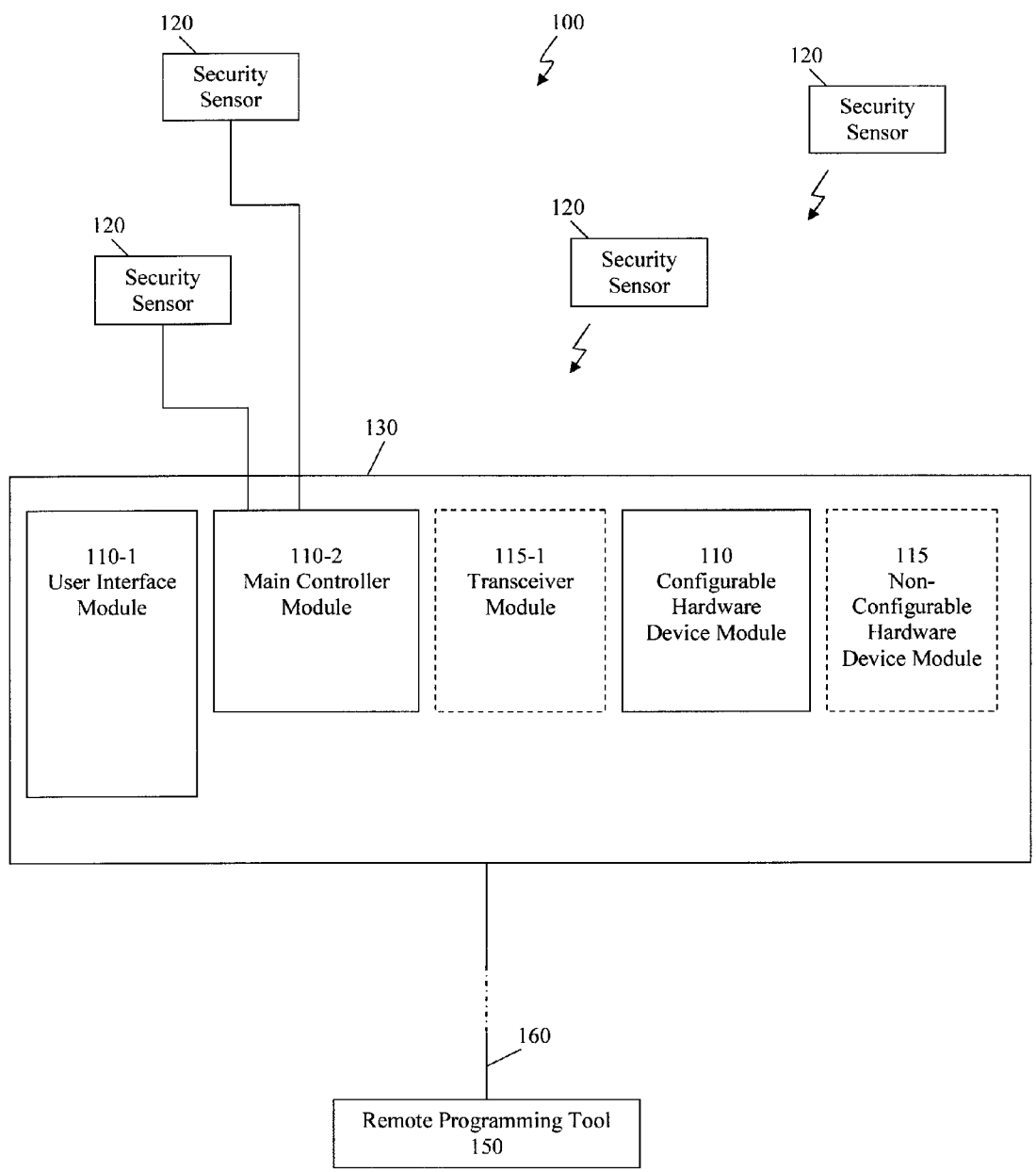
FIG. 1 is a block diagram of a security system according to one embodiment.

FIG. 1 is a block diagram of a security system 100 according to one embodiment. Security system 100 comprises a plurality of configurable hardware device module modules 110, including a user interface module 110-1 and a main controller module 110-2, a plurality of non-configurable modules 115, including optionally a non-configurable transceiver module 115-1, and a plurality of security sensor devices 120 that are connected directly to the main controller module 110-2 or wirelessly to the non-configurable transceiver module 115-1. Examples of other configurable hardware device modules 110 include, but are not limited to, an Ethernet interface module (not shown), a hardwired zone expander module (not shown), an additional user interface module (not shown), or a cellular communicator module (not shown). In some embodiments, multiple configurable hardware device modules 110 can be configured together. For example, in one embodiment multiple user interface modules (not shown) can be configured with the main controller module 110-2. Also, in some embodiments, all of the hardware device modules are configurable. As shown in FIG. 1, the configurable and non-configurable hardware device modules 110, 115 are all enclosed within a housing 130. However, in other embodiments, one or more of the configurable and non-configurable hardware device modules 110, 115 can be located outside of the housing 130 within a different housing and the configurable and non-configurable hardware device modules 110, 115 interact with the user interface module 110-1 via wireless communication. Since the configurable hardware device modules 110 of the security system 100 are modular, a new configurable hardware device module 110 can be added to the security system 100 and each configurable hardware device module 110 can be replaced with a new configurable hardware device module 110 or can be modified with enhanced functionality at any time.

Moreover, configurable hardware device modules 110 can be indirectly coupled to a remote programming tool 150. Since the configurable hardware device modules 110 of the security system 100 are modular, a new configurable hardware device module 110 can be added to the security system 100 and each configurable hardware device module 110 can be replaced with a new configurable hardware device module 110 or can be modified with enhanced functionality at any time. FIG. 1 shows the remote programming tool 150 indirectly coupled to the security system 100 via an Ethernet connection 160. In other embodiments the remote programming tool 150 can indirectly couple to the security system 100 via other means, for example a WiFi connection, a modem connection, a wireless connection or a cellular system like Global System for Mobile Communications (GSM)/General Packet Radio Service (GPRS).

Examples of security sensor devices 120 include, but are not limited to: a door/window sensor that detects when a portal is opened; a motion detector that detects movement within a space; a smoke detector that detects smoke within a set area; a heat detector that detects excessive heat within a set area; a low temperature detector that detects a potentially hazardous temperature within a set area; a glassbreak detector which detects a breakage of glass. The security sensor device 120 can also be a device initiated by a user, for example a key fob that allows the user to initiate a communication message by pressing a button on the keyfob.

In one embodiment, the security system 100 generally functions as follows. The security sensor devices 120 are used to send a signal or communication messages that contain status signals pertaining to the portions of the premises being monitored by the security system 100. In some embodiments, the sensor device 120 may simply be a switch that is directly connected to the main controller module 110-2 and sends a signal to the main controller module 110-2. In other embodiments, the sensor device 120 sends one or more communication messages through a direct wire connection to the main controller module 110-2. In these embodiments, where the sensor devices 120 are all connected directly to the main controller 110-2, a configurable transceiver module (not shown) or the non-configurable transceiver module 115-1 is not needed. However, in other embodiments, the sensor device 120 sends one or more communication messages wirelessly to a configurable transceiver module (not shown) or the transceiver module 115-1.

In the embodiment of FIG. 1, the transceiver module 115-1 receives one or more of the communications message and stores them in the main controller module 110-2. The main controller module 110-2 parses the received communication message and determines the appropriate action to be taken by the security system 100 and prepares and sends instruction signals to the appropriate hardware device modules 110, 115. Depending on the instruction signals sent by the main controller module 110-2, the various hardware device modules 110, 115 then perform the appropriate actions required by the instruction signals. For example, in the case of an emergency, an instruction signal can be sent to a telephone interface module that instructs the telephone interface module to transmit an event communication notifying a central station, located outside of the premises being secured, of an emergency and the need for police, fire or ambulance assistance.

Figure 2:
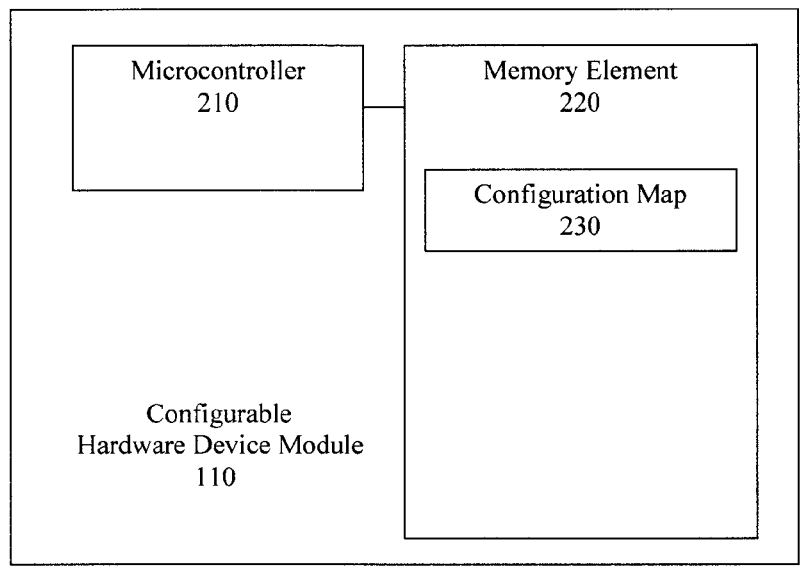
FIG. 2 is a block diagram of a configurable hardware device module according to one embodiment.

FIG. 2 is a block diagram of a configurable hardware device module 110 according to one embodiment. Each configurable hardware device module 110 includes at least a microcontroller 210 coupled to a memory element 220. Depending on its particular functionality, each configurable hardware device module 110 will also include other components (not shown) to perform their various functions. The memory element of each configurable hardware device module 110 stores a configuration map 230 that contains the types of configuration options available for programming the configurable hardware device module 110. The configuration map 230 is stored in the same format in every memory element 220 of every configurable hardware device module 110, but the configuration options available and stored onto the configuration map 230 may vary depending on the functionality of the configurable hardware device module 110.

Figure 3A:
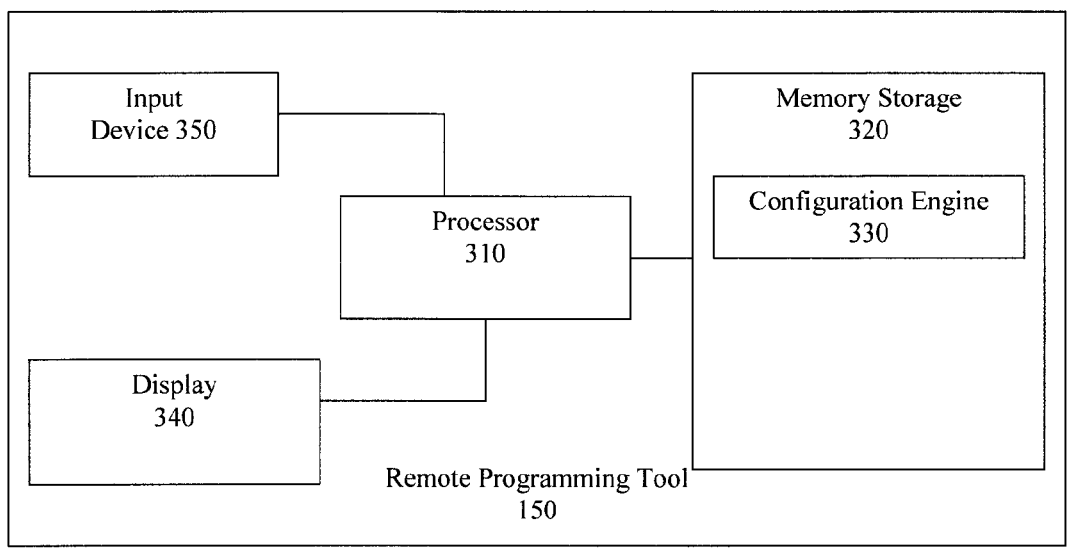
FIG. 3A is a block diagram of a remote programming tool prior to creating a dynamic user interface according to one embodiment.

FIG. 3A is a block diagram of the remote programming tool 150 prior to creating a dynamic user interface according to one embodiment. The remote programming tool 150 includes a processor 310, a memory storage 320 that stores a configuration engine 330 and is coupled to the processor 310, a display 340 coupled to the processor 310 and an input device 350 coupled to the processor 310. In one embodiment, the display 340 is a computer monitor and the input device 350 is a keyboard.

Figures 3B, 4:
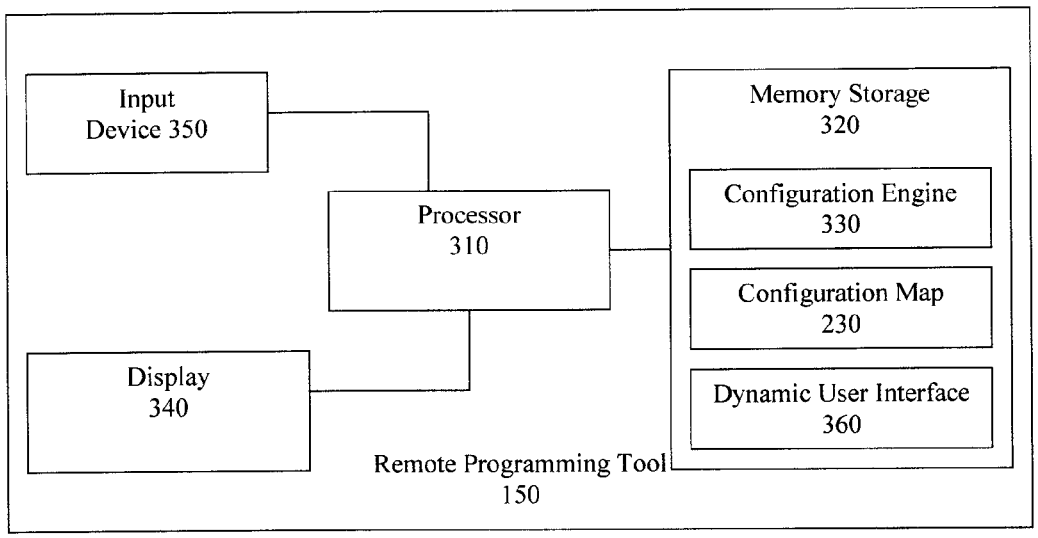
FIG. 3B is a block diagram of a remote programming tool after creating a dynamic user interface according to one embodiment.
FIG. 4 is an illustrative representation of a configuration map stored in a configurable hardware device module according to one embodiment.

FIG. 3B is a block diagram of the remote programming tool 150 after creating a dynamic user interface according to one embodiment. When the remote programming tool 150 is indirectly coupled to the configurable hardware device module 110, as shown in FIG. 1, a configuration map 230 is transferred from the configurable hardware device module 110 to the memory storage 320 of the remote programming tool 150. In some embodiments, the remote programming tool 150 can also compare a local copy of the configuration map 230 stored in the memory storage 320 from an earlier indirect coupling to a configurable hardware device module 110 of the same type, and transfer the new configuration map 230 only if it is different from the local copy of the configuration map 230. The processor 310 of the remote programming tool 150 uses the configuration engine 330 stored in the memory storage 320 and the information stored in the configuration map 230 that was transferred from the configurable hardware device module 110 to be programmed via the Ethernet connection 160 and creates a user friendly dynamic user interface 360. The dynamic user interface 360 is stored in the memory storage 320 of the remote programming tool 150 and is specifically tailored with the programming options available for programming the configurable hardware device module 110. The processor 310 sends the dynamic user interface 360 to the display 340 and allows the programming user to program configuration options made available by the configuration map 230 via the input device 350. The user can then configure the configurable hardware device module 110 using the input device 350 on the remote programming tool 150 to navigate through the various menus created in the remote programming tool 150. The options chosen by the user can be programmed onto the microcontroller 210 of the hardware device being programmed by sending the options chosen by the user using the remote programming tool 150 to the security system 100 via the Ethernet connection 160.

FIG. 4 is an illustrative representation of the configuration map 230 according to one embodiment. In this embodiment, the configuration map 230 is encoded using an ASCII (American Standard Code for Information Interchange) format. In other embodiments, the configuration map 230 is encoded using other formats, for example, a binary, hexadecimal or decimal format. The configuration map 230 includes one or more configurable options 405 used for configuring the configurable hardware device module 110 to the system 100. For each configurable option 405 available to the particular configurable hardware device module 110, the configuration map 230 includes a plurality of fields 410. Each field 410 is represented by an ASCII character used by the configuration engine 330 to identify the particular field 410 Following the ASCII character, the configuration map includes either an ASCII digit(s) for the value of the field, or an ASCII string delimited with quotation marks. The field 410-M describes the required identification of the predefined top level menu under which the configurable option 405 is placed on the display 340. Namely, the field 410-M designates which preset top level menu the configurable option 405 is placed under on the display 340. The field 410-M is also able to designate a new top level menu for the configurable option 405 if defined by the configurable hardware device module 110.

The field 410-I describes the required numeric identification of the configurable option 405 for display to the user. Namely, the field 410-I designates the displayed position on the display 340 of the configurable option 405 under the designated top level menu defined in the field 410-M.

The field 410-T describes the required data type to define the required validation of the user's input into the input device 350. Namely, the field 410-T designates the type of data required by the user to be inputted using the input device 350 for the particular configurable option 405. Data types that can be used include, for example, ASCII characters, decimal characters or dot-decimal characters.

The field 410-S describes the required size of the data type inputted in bytes. Namely, the field 410-S designates the required size to be inputted by the user into the input device 350 for the configurable option 405. However, in some embodiments, this field is omitted for Boolean data types as they only occupy ⅛ of a byte and are therefore required to be stored differently.

The field 410-C describes an optional count of items that consist of multiple identical entries. Namely, the field 410-C designates an index number to distinguish between two or more identical configurable options 405.

The field 410-G describes an optional index for denoting configurable options 405 that must be grouped together. Namely, the field 410-G designates two or more configurable options 405 that should be grouped together on the display 340.

The field 410-N describes an optional minimum value for numeric configurable options 405. Namely, the field 410-N designates the minimum number of options available for the user to input into the input device 350 for the configurable option 405.

The field 410-X describes an optional maximum value for numeric configurable options 405. Namely, the field 410-X designates the maximum number of options available for the user to input into the input device 350 for the configurable option 405.

The field 410-V describes an optional input validator selector for setting validation rules on the type of valid inputs that can be inputted by the user into the input device 260. Namely, the field 410-V validates that the entry input by the user into the input device 260 is a valid entry. Possible valid inputs include, for example, lower case characters, ASCII digits, or the like.

The field 410-D describes an optional value that will indicate that the configurable option 405 is disabled. Namely, the field 410-D designates the value that the configuration engine can store for the option that will turn off or disable the feature 340.

The field 410-A describes the required code indicating the type of programming access to provide for the configurable option 405. Namely, the field 410-A designates the type of user that is allowed access to change the configurable option 405. In one embodiment, there are three types of access available for the configurable option 405. The first type of access is no access, whereby the configurable option 405 is only installed and programmed during the manufacturing of the configurable hardware device module 110. The second type of access is installer access, whereby only a user with authorization is allowed to program the configurable option 405. The last type of access is users and installers access, whereby all users can program the configurable option 405.

The field 410-P describes the required text prompt for the user. Namely, the field 410-P designates the name of the configurable option 405 shown on the display 340.

Examples of several configurable options of a configuration map, including, for example, the account identifier, the communication method and the phone number identifier, according to one embodiment are listed below.

M1I1T0S3C4G1N000000XFFFFFFA1W1P\"account\"\
M1I2T1S1C4G1X4A1W1P\"comm method\"\
M1I3T0S13C4G1V9A1W1P\"phone number\"\

What is claimed is:

1. A security system comprising:
   a plurality of hardware device modules, at least one of which having a microcontroller coupled to a memory element that stores a configuration map for remote configuration encoded with configuration option information available for the at least one hardware device module;
   a plurality of security sensor detection devices, wherein each of the plurality of security sensor devices is configured to monitor a premises and is capable of sending a status signal to one or more of the hardware device modules based on a change in status of the area being monitored; and
   a remote programming tool that includes a configuration engine, wherein the remote programming tool is indirectly coupled to the at least one hardware device module and is configured to receive the configuration map from the at least one hardware device module, and generate a dynamic user interface to configure the at least one hardware device module based on the received configuration map from one of the hardware device modules using the configuration engine of the remote programming tool, and;
   wherein the plurality of hardware device modules includes a main controller module configured to receive the status signal from one of the plurality of security sensor detection devices and send an instruction signal to one of the plurality of hardware device modules based on the status signal and the dynamic user interface is specifically tailored to the one of the hardware device modules and also tailored with programming options available for programming the hardware device module, the remote programming tool further includes a display that displays the dynamic user interface and a user input device that is capable of configuring options provided in the dynamic user interface; a user is allowed to configure the hardware device module using the user input device on the remote programming tool to navigate through menus created in the remote programming tool; wherein the dynamic user interface is sent to the display; the configuration map includes a plurality of fields for configuration option information, each field is represented by an ASCII character used by the configuration engine to identify the particular field thereof, the fields in the configuration map includes a combination of: a menu identification, a menu index identification, an input data type, an input data size, a multiple entry index, a grouping index, a minimum user input value, a maximum user input value, an input validator selector, a value used to disable a feature, a user access index and a text prompt, wherein the configuration map is pre-installed in the hardware device module itself or the configuration map is updated by a vendor of the hardware device module of the pre-installed configuration map therein.

2. The security system of claim 1, wherein the remote programming tool is indirectly coupled to the security system via a data network.

3. The security system of claim 1, wherein the remote programming tool is a personal computer, the display is a monitor and the user input device is a keyboard.

4. The security system of claim 1, wherein the configuration option information includes a plurality of configurable options, each configurable option including a plurality of fields represented by a field identifier and either a value of the field or a string, and each configurable option includes an input data size field.

5. The security system of claim 1, wherein the configuration map is encoded in a binary, hexadecimal, or decimal format.

6. The security system of claim 1, wherein the plurality of security sensor detection devices includes one of: a door/window sensor; a motion detector sensor; a smoke detector sensor; a heat detector sensor; a low temperature detector sensor; a glass break detector sensor; or a key fob.

7. The security system of claim 1, wherein the remote programming tool compares a local copy of the configuration map stored in the remote programming tool from an earlier indirect coupling to one of the configurable hardware device modules of the same type, and the one of the configurable hardware device modules transfers a new configuration map to the remote programming tool only if the new configuration map is different from the local copy of the configuration map.

8. A configurable hardware device module usable in a security system, the configurable hardware device module comprising:
   a microcontroller;
   a memory element coupled to the microcontroller; and
   a configuration map stored in the memory element for remote configuration of the hardware device module;
   wherein the configurable hardware device module is configured to send the configuration map encoded with a configuration option information to a remote programming tool for programming the configurable hardware device module when the configurable hardware device module is indirectly coupled to the remote programming tool;
   the remote programming tool uses the configuration map transferred from the configurable hardware device module and a configuration engine to create a dynamic user interface;
   the dynamic user interface is tailored with programming options available for programming the hardware device module; and
   the microcontroller of the configurable hardware device is programmed by options from the remote programming tool;
   wherein the configuration map includes a plurality of fields for configuration option information, each of the fields is represented by an ASCII character used by the configuration engine to identify the particular field, the fields in the configuration map includes a combination of: a menu identification, a menu index identification, an input data type, an input data size, a multiple entry index, a grouping index, a minimum user input value, a maximum user input value, an input validator selector, a value used to disable a feature, a user access index and a text prompt, wherein the configuration map is pre-installed in the configurable hardware device module itself or the configuration map is updated by a vendor of the hardware device module of the pre-installed configuration map therein, the dynamic user interface is specifically tailored to the configurable hardware device module, the remote programming tool further includes a user input device for configuring options provided in the dynamic user interface; a user is allowed to configure the configurable hardware device module using the user input device on the remote programming tool to navigate through menus created in the remote programming tool.

9. The configurable hardware device module of claim 8, wherein the remote programming tool compares a new configuration map to a local copy of the configuration map stored in the remote programming tool from an earlier indirect coupling to one of the configurable hardware device modules of the same type, and the one of the configurable hardware device modules transfers the new configuration map to the remote programming tool only if the new configuration map is different from the local copy of the configuration map.

10. A remote programming tool capable of indirectly coupling to a security system comprising of a configurable hardware device module, the remote programming tool comprising:
  a processor;
  a memory storage coupled to the processor; and
  a configuration engine stored in the memory storage that is configured to generate a dynamic user interface for configuring the configurable hardware device module of the security system based on a configuration map of the configurable hardware device module when the configurable hardware device module is indirectly coupled to the remote programming tool;
  the processor of the remote programming tool uses the configuration engine stored in the memory storage therein and information stored in the configuration map transferred from the configurable hardware device module to create the dynamic user interface;
  the dynamic user interface is tailored with programming options available for programming the configurable hardware device module;
  the microcontroller of the configurable hardware device is programmed by options from the remote programming tool; and
  wherein the configuration engine is configured to decode the received configuration map encoded with configuration option information that includes a plurality of configurable options, the dynamic user interface is specifically tailored to the configurable hardware device module of the security system, the configuration engine and the dynamic user interface are residing in the remote programming tool, and the configuration map is transferred into the remote programming tool from the configurable hardware device module the configuration map includes a plurality of fields for configuration option information, each of the fields is represented by an ASCII character used by the configuration engine to identify the particular field, the fields in the configuration map includes a combination of: a menu identification, a menu index identification, an input data type, an input data size, a multiple entry index, a grouping index, a minimum user input value, a maximum user input value, an input validator selector, a value used to disable a feature, a user access index and a text prompt, wherein the configuration map is pre-installed in the configurable hardware device module itself or the configuration map is updated by a vendor of the hardware device module of the pre-installed configuration map therein.

11. The remote programming tool of claim 10, wherein thereby comparing a new configuration map to a local copy of the configuration map stored therein from an earlier indirect coupling to one of the configurable hardware device modules of the same type, and the one of the configurable hardware device modules transfers the new configuration map to the remote programming tool only if the new configuration map is different from the local copy of the configuration map.

12. The remote programming tool of claim 10, wherein the remote programming tool is a personal computer.

13. The remote programming tool of claim 10, further comprising a display coupled to the processor that displays the dynamic user interface and a user input device coupled to the processor that is capable to be used to configure options provided in the dynamic user interface.

14. A method of remote configuration of a configurable hardware device module of a security system, the method comprising:
  providing a configurable hardware device module having a configuration map encoded with configuration option information that includes a plurality of configurable options for configuring the configurable hardware device module, wherein the configuration map includes a plurality of fields for the configuration option information, each of the fields is represented by an ASCII character used by the configuration engine to identify the particular field, the fields in the configuration map includes a combination of: a menu identification, a menu index identification, an input data type, an input data size, a multiple entry index, a grouping index, a minimum user input value, a maximum user input value, an input validator selector, a value used to disable a feature, a user access index and a text prompt, wherein the configuration map is pre-installed in the configurable hardware device module itself or the configuration map is updated by a vendor of the hardware device module of the pre-installed configuration map therein;
  indirectly coupling a remote programming tool having a configuration engine, a display and a user input device to the security system;
  transferring the configuration map from the configurable hardware device module to the remote programming tool;
  generating a dynamic user interface using the configuration engine of the remote programming tool and the configuration map of the configurable hardware device module, wherein the dynamic user interface is specifically tailored to the configurable hardware device module, the configuration engine is residing in the remote programming tool and the configuration map is transferred into the remote programming tool from the configurable hardware device module; and
  programming a microcontroller of the configurable hardware device by options from the remote programming tool.

15. The method of claim 14, wherein the remote programming tool compares a new configuration map to a local copy of the configuration map stored in the remote programming tool from an earlier indirect coupling to one of the configurable hardware device modules of the same type, and the one of the configurable hardware device modules transfers the new configuration map to the remote programming tool only if the new configuration map is different from the local copy of the configuration map.

16. The method of claim 14, wherein the remote programming tool is a personal computer.

* * * * *